(12) United States Patent
Tanisho et al.

(10) Patent No.: US 6,630,234 B1
(45) Date of Patent: Oct. 7, 2003

(54) POLYMERIC FILM AND FILM CAPACITOR

(75) Inventors: Hajime Tanisho, Nara (JP); Yuichiro Konishi, Tokyo (JP); Teiji Kohara, Kawasaki (JP)

(73) Assignee: Nippo Zeon Co., Ltd., Tokyo (JP)

( * ) Notice: Subject to any disclaimer, the term of this patent is extended or adjusted under 35 U.S.C. 154(b) by 0 days.

(21) Appl. No.: 09/446,309

(22) PCT Filed: Jun. 17, 1998

(86) PCT No.: PCT/JP98/02676

§ 371 (c)(1),
(2), (4) Date: Dec. 20, 1999

(87) PCT Pub. No.: WO98/58987

PCT Pub. Date: Dec. 30, 1998

(30) Foreign Application Priority Data

Jun. 20, 1997 (JP) ............................................. 9/180553

(51) Int. Cl.⁷ ........................... B32B 5/16; B32B 15/08; B32B 27/00; H01G 4/00
(52) U.S. Cl. ...................... 428/323; 428/325; 428/330; 428/332; 428/409; 428/457; 428/461; 428/462; 428/500; 428/521; 361/301.1; 361/301.5; 361/311; 361/312; 361/313; 361/323
(58) Field of Search ................................ 428/332, 500, 428/323, 325, 330, 521, 409, 457, 461, 462; 361/311, 323, 312, 313, 301.5, 301.1

(56) References Cited

U.S. PATENT DOCUMENTS

| | | | | |
|---|---|---|---|---|
| 4,654,249 A | * | 3/1987 | Barbey et al. ............... | 428/148 |
| 4,731,390 A | | 3/1988 | Mizuno et al. .............. | 521/134 |
| 4,795,671 A | * | 1/1989 | Shiiki et al. ................ | 428/209 |
| 4,814,221 A | * | 3/1989 | Utsumi ........................ | 428/220 |
| 5,401,558 A | * | 3/1995 | Sakamoto et al. .......... | 428/141 |
| 5,583,192 A | | 12/1996 | Bennett et al. | |
| 6,017,616 A | * | 1/2000 | Kochem et al. ............. | 428/220 |
| 6,030,255 A | * | 2/2000 | Konishi et al. ............. | 439/578 |

FOREIGN PATENT DOCUMENTS

| | | |
|---|---|---|
| CA | 2188235 | 4/1997 |
| DE | 224538 A1 | 7/1985 |
| EP | 0610815 A2 | 2/1994 |
| EP | 0769371 A2 | 4/1997 |
| JP | 55-34968 | 3/1980 |
| JP | 1-101336 | 4/1989 |
| JP | 1-232608 | 9/1989 |
| JP | 8-176318 | 7/1996 |
| JP | 8-330180 | 12/1996 |
| JP | 9-123351 | 5/1997 |
| WO | WO 96/24177 * | 8/1996 |

OTHER PUBLICATIONS

European Search Report dated Dec. 27, 2000.

* cited by examiner

*Primary Examiner*—Monique R. Jackson
(74) *Attorney, Agent, or Firm*—Armstrong, Westerman & Hattori, LLP

(57) ABSTRACT

By using a polymeric film having a dielectric loss tangent of 0.002 or less measured at a frequency in the range of 1 kHz to 1 GHz at a temperature of 25 ° C., heat generation of dielectric loss of capacitors can be reduced and rising of temperature can be inhibited, and, can highly stand the rise of temperature, whereby further miniaturization and increase in capacity of capacitors become possible. Furthermore, the problems in handling that the films are apt to cut or become entangled at the rewinding step can be greatly improved by using polymeric films which are 1 or less in friction coefficient between the films of the same material. Accordingly, the polymeric films are excellent in performance of insulator film, namely, small in dielectric loss tangent, and, moreover, are free from the problems in handling that the films are apt to cut or become entangled at the rewinding step. Furthermore, the polymeric films are suitable for film capacitors.

13 Claims, No Drawings

POLYMERIC FILM AND FILM CAPACITOR

TECHNICAL FIELD

The present invention relates to polymeric films used as electrical insulators or dielectrics. More particularly, it relates to polymeric films small in dielectric loss tangent, excellent in heat resistance and low in friction coefficient between the films, and to film capacitors comprising the polymeric films.

BACKGROUND ART

Insulators comprising thermoplastic resins are used for earth insulation, layer insulation and conductor insulation of motors and insulation of transformers, and as dielectrics of capacitors in place of conventionally used papers, cloths or impregnated products thereof, and mica. As the thermoplastic resins used as these insulators, the most popular are polypropylenes (PP). Moreover, recently, among insulators comprising thermoplastic resins, those which are high in insulation resistance, excellent in frequency characteristics and high in flexibility are used as dielectrics of film capacitors for radio communication equipment of airplanes, ships and vehicles; for household DC electrical apparatuses such as radios, televisions and audios; for driving of small motors such as those of air conditioners, washing machines and electric fans; and for improvement of electric power of fluorescent lamps and mercury vapor lamps. Polyethylene terephthalate (PET), PP and the like are used as thermoplastic resin materials used for these film capacitors and the like.

However, though PP films are good in electric characteristics such as small dielectric loss tangent, they are inferior in heat resistance. On the other hand, PET is superior in heat resistance, but has the problem of increase of temperature caused by heat generation of dielectric loss due to the great dielectric loss tangent, resulting in problems that miniaturization and increase of capacity of capacitors are difficult.

It is disclosed that films comprising thermoplastic cyclic olefin resins are useful as insulation films for communication, electronic equipment and electric equipment because they are good in electrical characteristics such as dielectric loss tangent and superior in heat resistance, and, besides, are hardly affected by environments such as water (JP-A-2-102256, JP-A-5-148413). However, these films suffer from the problem in handling that they are apt to cut or become entangled, for example, in rewinding step carried out several times in the process of production of capacitor films.

Hitherto, no films have been known which are excellent in performance as insulator films, namely, excellent in heat resistance and small in dielectric loss tangent and are free from the problems in handling, namely, tendency of cutting or becoming entangled at the rewinding step.

An object of the present invention is to provide a polymeric film which is excellent in performance as insulator film, namely, small dielectric loss tangent and free from the problems in handling that the film is apt to cut or become entangled at the rewinding step.

Another object of the present invention is to provide a polymeric film excellent in heat resistance in addition to the above characteristics.

Further object of the present invention is to provide a film capacitor comprising the above polymeric film.

DISCLOSURE OF INVENTION

As a result of intensive research conducted by the inventors in an attempt to solve the above problems, it has been found that, from the point of performance of insulator films, when a polymeric film having a dielectric loss tangent of 0.002 or less measured at a frequency in the range of 1 kHz to 1 GHz at a temperature of 25° C. is used, heat generation of dielectric loss of capacitor can be reduced and rising of the temperature can be inhibited, and, hence, further miniaturization and increase in capacity of capacitor are possible, also due to the fact that the capacitor per se can stand the rise of temperature.

Furthermore, as a result of intensive research conducted by the inventors, it has been found that the problem in handling of the films that they are apt to cut or become entangled at the rewinding step depends on the friction coefficient of the films, and this problem in handling of the films can be markedly improved by using polymeric films which are 1 or less in friction coefficient between the films of the same material. Thus, the present invention has been accomplished.

Moreover, the present invention provides a film capacitor using the above-mentioned polymeric films.

Best Mode for Carrying Out the Invention

The preferred embodiments of the present invention will be explained below on respective items.

Molding Materials as Raw Materials for Polymeric Films

Molding materials used for making the polymeric films of the present invention are not limited as far as they have a dielectric loss tangent of 0.002 or less measured at a frequency in the range of 1 kHz to 1 GHz at a temperature of 25° C., and when they are molded into films, the films comprising the same molding material have a friction coefficient of 1 or less between these films. The molding materials may be thermoplastic or thermosetting and, if necessary, may contain various additives. The molding materials comprising thermoplastic resins are preferred because of easiness in melt extrusion molding by which films can be obtained with high productivity. In order to obtain polymeric films of small dielectric loss tangent, it is preferred to select those which have a small electric dipole moment of repeating skeleton unit in the chemical formula of the resins (polymers) as raw materials.

Molding Materials Comprising Thermoplastic Cyclic Olefin Resins

Polymeric films of the present invention which have a dielectric loss tangent of 0.002 or less measured at a frequency in the range of 1 kHz to 1 GHz at a temperature of 25° C., and have a friction coefficient of 1 or less between the films of the same material when molded into films are preferably those which comprise 100 parts by weight of a thermoplastic cyclic olefin resin and 0.01–3 parts by weight of at least one kind of particles selected from the group consisting of inorganic particles and silicone particles having an average particle diameter of 0.05–5 μm.

The thermoplastic cyclic olefin resins usable in the present invention are non-crystalline and transparent resins having a hydrocarbon cyclic structure in the main chain or side chain of polymers. As examples of these resins, mention may be made of ring opening polymers of monomers having a norbornene ring and hydrogenation products of the polymers as disclosed in JP-A-63-264646, JP-A-64-1705, JP-A-1-168724 and JP-A-1-168725; addition polymers of monomers having a norbornene ring with α-olefins as disclosed in JP-A-60-168708; and addition polymers of cyclic olefins or cyclic dienes and hydrogenation products of the polymers as disclosed in JP-A-6-136057 and JP-A-7-258362. These resins are available in the name of registered trademark ZEONEX from Nippon Zeon Co., Ltd., and registered trademarks APEL, APO, etc. from Mitsui Petrochemical Industries, Ltd. As other examples, mention may be made of polystyrene resins having a specific structure as disclosed in JP-A-1-316246 and JP-A-6-29146.

Among them, preferred are hydrogenation products of ring opening polymers of monomers having a norbornene ring or addition polymers of monomers having a norbornene ring with α-olefins, and more preferred are the hydrogenation products of ring opening polymers of monomers having a norbornene ring. This is because the resulting polymeric films are excellent in heat resistance and strength.

Examples of the monomers having a norbornene ring are norbornenes of bicyclic olefins which are adducts of ethylene with cyclopentadiene, tetracyclododecenes of tetracyclic olefins to which cyclopentadiene is added, tricyclodecadienes (also called dicyclopentadienes) which are tricyclic dienes and dimers of cyclopentadienes, tricyclodecenes which are tricyclic olefins having unsaturated bonds a part of which are saturated by hydrogenation, pentacyclopentadecadienes which are pentacyclic dienes and trimers of cyclopentadienes, pentacyclopentadecenes (also called 2,3-dihydrodicyclopentadienes) which are pentacyclic olefins having unsaturated bonds a part of which are saturated by hydrogenation; and substitution products of these monomers. As the substitution products, mention may be made of derivatives substituted with groups having no polar groups, such as alkyl groups, alkylidene groups or aromatic groups or hydrogenation products of these derivatives or derivatives obtained by dehydrogenation of the above derivatives (for example, norbornene derivatives such as 2-norbornene, 5-methyl-2-norbornene, 5,5-dimethyl-2-norbornene, 5-ethyl-2-norbornene, 5-butyl-2-norbornene, 5-ethylidene-2-norbornene, 5-hexyl-2-norbornene, 5-phenyl-2-norbornene, 5-octyl-2-norbornene, 5-octadecyl-2-norbornene, and 5-ethylidene-2-norbornene, tetracyclododecene derivatives such as 1,4:5,8-dimethano-1,2,3,4,4a, 5,8,8a-2,3-cyclopentadienooctahydronaphthalene, 6-methyl-1,4:5,8-dimethano-1,4,4a,5,6,7,8,8a-octahydronaphthalene, and 1,4:5,10:6,9-trimethano-1,2,3,4,4a, 5,5a,6,9,9a,10,10a-dodecahydro-2,3-cyclopentadienoanthracene, etc.); substitution products substituted with polar groups such as halogen, hydroxyl group, ester group, alkoxy group, cyano group, amide group, imide group and silyl group (for example, 5-methoxy-carbonyl-2-norbornene, 5-cyano-2-norbornene and 5-methyl-5-methoxycarbonyl-2-norbornene).

The α-olefins include olefins in a narrow sense, such as ethylene, propylene, 1-butene and 4-methylpentene-1, and, in addition, olefinic monomers a part of which is substituted with polar groups such as halogen.

The cyclic olefins include monocyclic cycloolefins such as cyclobutene, 1-methylcyclopentene, 3-methylcyclobutene, 3,4-diisopropenylcyclobutene, cyclopentene, 3-methylcyclopentene, cyclohexene, cyclooctene, 1-methylcyclooctene, 5-methylcyclooctene, cyclooctatetraene, and cyclododecene, and, besides, the above-mentioned monomers having a norbornene ring which have one unsaturated bond.

The cyclic dienes include monocyclic dienes such as cyclopentadiene, 1,3-cyclohexadiene and 1,4-cyclohexadiene, and, besides, above-mentioned monomers having norbornene ring which have two unsaturated bonds.

Furthermore, both the ring opening polymerization and the addition polymerization may be carried out with copolymerization of copolymerizable various monomers in the respective catalyst systems in which the polymerization is to be carried out. The copolymerizable monomers include straight chain or branched chain dienes such as butadiene and isoprene in addition to the above-mentioned monomers having norbornene ring, α-olefins, cyclic olefins and cyclic dienes. The polymerization may be random type, block type or alternating type, and, in the case of the addition polymerization including 1,2-addition and 1,4-addition, either of them may be main.

In order to obtain the polymeric film small in dielectric loss tangent which is the object of the present invention, among the above monomers, those which are small in dipole moment in the molecule, for example, those having no polar group, are used in an amount of preferably 50% by weight or more, especially preferably 70% by weight or more.

In case the unsaturated bonds remain in the polymer after polymerized, namely, in the case of the ring opening polymer of monomers having norbornene ring or the addition polymer of cyclic dienes, weathering stability and heat stability are deteriorated by the remaining unsaturated bonds, and, for the purpose of solving these problems, it is preferred to saturate 80% or more, preferably 90% or more of the unsaturated bonds by hydrogenation. The hydrogenation can be carried out by known methods using known hydrogenation catalysts.

For obtaining the polymeric films of the present invention, it is preferred to use thermoplastic cyclic olefin resins of high heat resistance, namely, high glass transition temperature (Tg) as raw materials, and Tg is preferably 90–350° C., especially preferably 120–300° C. Polymeric films of high softening temperature can be obtained with superior moldability from the molding materials comprising the above thermoplastic cyclic olefin resins.

It is also preferred to remove or reduce, by known methods, residues such as catalysts in the polymer solution after polymerization or hydrogenation reaction. The method for recovery of the polymer from the polymer solution is also not limited, but it is important to remove residual volatile matter as much as possible. There are a method which comprises carrying out the washing referred to in the method for removal of the catalyst, and then removing the solvent by filtration, followed by heating or heating under vacuum, a method which comprises removing metallic contaminants by precipitation and agglomeration and subjecting the resulting resin solution to direct heating or heating under vacuum to remove the solvent, and other methods.

Molecular weight of the polymer is measured by dissolving the polymer in a good solvent for the polymer, such as toluene or tetrahydrofuran and subjecting the resulting solution to gel permeation chromatography. Number-average molecular weight (Mn) is usually 12,000–50,000 in terms of polystyrene, and weight-average molecular weight (Mw) is 20,000–80,000. The molecular weight can be expressed as a solution viscosity [η], and [η] is preferably 0.05–20 dl/g, more preferably 0.1–10 dl/g, most preferably 0.2–2 dl/g. The molecular weight distribution Mw/Mn is preferably 1.0–7, more preferably 1.5–5. Within the above range, strength of the polymeric film obtained from the polymer and molding processability in production of the polymeric film are highly balanced and this is suitable.

The molding materials for obtaining the polymeric films of the present invention can be obtained by adding specific inorganic particles or silicone particles in a specific amount to the above thermoplastic cyclic olefin resins.

The inorganic particles in the present invention are those of oxides, hydroxides, sulfides, nitrides, halides, carbonates, sulfates, acetates, phosphates, phosphites, organic carboxylates, silicates, titanates, borates and their hydrate compounds of elements of Groups 1, 2, 4, 6, 7, 8–10, 11, 12, 13 and 14, composite compounds mainly composed of the above compounds, and natural mineral particles having these chemical compositions. Examples thereof are particles of compounds of the elements of Group 1 such as lithium fluoride and borax (hydrated sodium borate); compounds of the elements of Group 2 such as magnesium carbonate, magnesium phosphate, magnesium oxide (magnesia), magnesium chloride, magnesium acetate, magnesium fluoride, magnesium titanate, magnesium silicate, hydrated magnesium silicate (talc), calcium carbonate, calcium phosphate, calcium phosphite, calcium sulfate (gypsum), calcium acetate, calcium terephthalate, calcium hydroxide, calcium silicate, calcium fluoride, calcium titanate, strontium titanate, barium carbonate, barium phosphate, barium sulfate, and barium phosphite; compounds of the elements of Group 4 such as titanium dioxide (titania), titanium monoxide, titanium nitride, zirconium dioxide (zirconia), and zirconium monoxide; compounds of the elements of Group 6 such as molybdenum dioxide, molybdenum trioxide and molybdenum sulfide; compounds of the elements of Group 7 such as manganese chloride and manganese acetate; compounds of the elements of Groups 8–10 such as cobalt chloride and cobalt acetate; compounds of the elements of Group 11 such as cuprous iodide; compounds of the elements of Group 12 such as zinc oxide and zinc acetate; compounds of the elements of Group 13 such as aluminum oxide (alumina), aluminum hydroxide, aluminum fluoride, and alumino silicate (alumina silicate, kaolin, kaolinite); compounds of the elements of Group 14 such as silicon oxide (silica, silica gel), plumbago, carbon, graphite and glass; and natural minerals such as carnallite, kainite, mica (mica, phlogopite) etc.

Of the particles used in the present invention, preferred are silicone particles, silica or calcium carbonate because the friction coefficient between the films can be effectively reduced. Furthermore, spherical particles having a ratio of longer side and shorter side of 2/1 or lower are preferred to acicular particles.

Among inorganic particles or silicone particles, those of smaller average particle diameter are used. The average particle diameter is an average particle diameter measured from the diameters of 3000–5000 particles by electron microscope, etc., and for the object of the present invention, the average particle diameter is usually 0.05–5 µm, preferably 0.1–4 µm, more preferably 0.2–3 µm. If the average particle diameter of the particles is too large, surface smoothness of the film is insufficient, resulting in unevenness, and conversely if the particle diameter is too small, the effect to reduce the friction coefficient between films cannot be obtained.

The surface of these inorganic particles can be subjected to surface treatment depending on the kind of the thermoplastic cyclic olefin resin used. Examples of the surface treatments are silane coupling agent treatment and acid treatment. By these surface treatments, adhesion between the interface of the inorganic particles and the resin layer is enhanced in the resulting composition or polymeric film, resulting in the effects such as improvement of mechanical strength. Thus, this is preferred.

The particles used in the present invention may be used each alone or in combination of two kinds or more. Amount of the particles used can be optionally selected, but is usually 0.01–3 parts by weight, preferably 0.05–2.5 parts by weight based on 100 parts by weight of the thermoplastic cyclic olefin resin. When the amount of the particles is within this range, dielectric loss tangent, dielectric breakdown strength and friction coefficient between films are highly well balanced and the range is suitable.

If necessary, the molding materials comprising the thermoplastic cyclic olefin resins can contain, in addition to the above thermoplastic cyclic olefin resin, the inorganic particles and the silicone particles, other thermoplastic resins, soft polymers, lubricants, oxidation stabilizers, ultraviolet absorbers, crystal nucleating agents, hydrochloric acid adsorbers, antistatic agents, and other additives generally industrially used for thermoplastic resins.

As the other thermoplastic resins, mention may be made of, for example, polyolefins such as low-density polyethylene, high-density polyethylene, straight chain low-density polyethylene, ultra-low-density polyethylene, polypropylene, polybutene, and polypentene; polyesters such as polyethylene terephthalate and polybutylene terephthalate; polyamides such as nylon-6 and nylon-6,6; ethylene-ethyl acrylate copolymer, ethylene-vinyl acetate copolymer, polystyrene, polyphenylene sulfide, polyphenylene ether, polyamide, polyester, polycarbonate, etc. These other thermoplastic resins can be used each alone or in combination of two or more, and amount thereof can be optionally selected as far as attainment of the object of the present invention is not hindered.

The soft polymers are not limited, as far as at least one Tg is 40° C. or lower. Examples of the soft polymers are random or block copolymers of aromatic vinyl monomers and conjugated diene monomers such as styrene-butadiene block copolymer, styrene-butadiene-styrene block copolymer, styrene-isoprene block copolymer, styrene-isoprene-styrene block copolymer and styrene-butadiene random copolymer, and hydrogenation products of these copolymers; polyisoprene rubber; polyolefin rubbers such as ethylene-propylene copolymer, ethylene-α-olefin copolymer and propylene-α-olefin copolymer, diene copolymers such as ethylene-propylene-diene copolymer, α-olefin-diene copolymer, diene copolymer, isobutylene-isoprene copolymer and isobutylene-diene copolymer; and norbornene rubber-like polymers such as copolymers of norbornene monomers and ethylene or α-olefin, terpolymers of norbornene monomers, ethylene and α-olefin, and ring opening polymers of norbornene monomers. These other soft polymers can be used each alone or in combination of two or more. Amount thereof can be optionally selected as far as attainment of the object of the present invention is not hindered.

It is preferred to use antioxidants, and examples thereof are phenolic antioxidants, phosphorus antioxidants, sulfur antioxidants, etc. Among them, phenolic antioxidants are preferred, and especially preferred are alkyl-substituted phenolic antioxidants such as octadecyl-3-(3,5-di-t-butyl-4-hydroxyphenyl) propionate and tetrakis(methylene-3-(3',5'-di-t-butyl-4'-hydroxyphenyl)propionate methane. Phosphorus antioxidants are not limited as far as they are ordinarily used in general resin industries, and examples thereof are triphenyl phosphite, tris(cyclohexylphenyl) phosphite, 10-decyloxy-9,10-dihydro-9-oxa-10-phosphaphenanthrene, etc. Examples of sulfur antioxidants are dimyristyl 3,3'-thiodipropionate, distearyl 3,3'-thiodipropionate, laurylstearyl 3,3'-thiodipropionate, pentaerythritol-tetrakis-(β-lauryl-thio-propionate), etc.

These antioxidants can be used each alone or in combination of two or more. Amount of the antioxidants is usually 0.001–5 parts by weight, preferably 0.01–1 part by weight based on 100 parts by weight of the thermoplastic cyclic olefin resin.

Antistatic agents can be used for the purpose of further inhibiting the entanglement of the films. Examples of the antistatic agents are sodium alkylsulfonates and/or phosphonium alkylsulfonates, fatty acid ester hydroxyamine compounds such as glycerin esters of stearic acid, etc. These antistatic agents can be used each alone or in combination of two or more. Amount of the antistatic agents is usually 0–5 parts by weight based on 100 parts by weight of the thermoplastic cyclic olefin resin.

For the improvement of molding processability of the polymeric film, there may be added lubricants, e.g., metallic salts of fatty acids such as zinc stearate, calcium stearate and calcium 1,2-hydroxystearate, and fatty acid esters with polyhydric alcohols such as glycerin monostearate, glycerin distearate, pentaerythritol distearate and pentaerythritol tristearate. Amount of the lubricants is optionally selected as far as attainment of the object of the present invention is not hindered.

Molding materials are prepared by mixing resins (polymers) as raw materials and various additives by conventional methods. The mixing methods include, for example, kneading them at such a resin temperature as the resin being in molten state by ribbon blender, Henschel mixer, twin-screw kneader or the like. After mixing them, the mixture is made into a shape suitable for the subsequent molding, for example, pellets in the form of grains of rice or tablets of about several grams to several hundred grams.

Addition of the additives in master batch method is also preferred. This method can be preferably employed in the case of adding the additives in a small amount of not more than 3 parts by weight, such as addition of inorganic particles or silicone particles in the present invention. The master batch method is a method which comprises previously preparing a cyclic olefin resin composition containing an additive at a concentration higher than the desired concentration (preferably 2–1,000 times, more preferably 5–500 times) (said composition is called master batch) and adding the composition to obtain the desired concentration. By this method, concentration of the additive can be accurately and freely controlled. The cyclic olefin resin used for the master batch and the cyclic olefin resin used mainly are preferably high in compatibility with each other, and more preferably have glass transition temperatures and molecular weights which are close to each other, respectively. Use of the same resin is most preferred.

Polymeric Film

In the present invention, the polymeric film is obtained by molding the above molding material. The method is not limited, and there may be employed, for example, a method of extrusion molding the molding material from a single-screw or twin-screw extruder using a die for film, a method of directly obtaining a film of a given thickness by inflation or calender molding method, and a two-stage method of heating and melting the molding material, obtaining a preliminary molded product therefrom, heating and stretching the product, and, if necessary, heat fixing it.

In the case of employing the two-stage method, the procedure from heating and melting to heat fixing comprises, first, usually, extrusion molding the molding material to prepare a preliminary molded product for stretching (film, sheet or tube). In this molding, generally the heated and molten molding material is molded into a given size by an extrusion molding machine, but the molding material in softened state may be molded without heating and melting the molding material (fluidized state). The extrusion molding machine used here may be either a single-screw extrusion molding machine or a twin-screw extrusion molding machine, and, furthermore, may be vented or not vented. When a suitable filter is provided for the extruder, extraneous matters and foreign substances can be removed and this is preferred. The filter may be in the form of flat plate, cylinder or the like and may be suitably selected. Extrusion conditions are not limited and can be suitably selected depending on various circumstances, but preferably the temperature is selected in the range of temperature lower 50° C. than Tg -decomposition temperature of the molding material and the shearing stress is usually $2 \times 10^5$–$5 \times 10^6$ dyne/cm$^2$. The dies used may be T-die, ring die, etc.

The resulting preliminary molded product to be stretched is solidified by cooling. The cooling media in this case may be gas, liquid, metallic roll and other various media. In the case of using a metallic roll or the like, when air knife, air chamber, touch roll, application of static electricity or the like is employed, non-uniform thickness and surface waviness can be effectively avoided. The temperature of solidification by cooling is usually in the range of from 0° C. to a temperature higher 30° C. than the glass transition temperature of the preliminary molded product to be stretched, preferably in the range of from a temperature lower 70° C. from the glass transition temperature to the glass transition temperature. The cooling rate is optionally selected in the range of 3–200° C./sec. The cooled and solidified preliminary molded product is monoaxially or biaxially stretched to obtain a polymeric film. In the case of the biaxial stretching, the preliminary molded product may be stretched simultaneously in lengthwise direction and width wise direction, but may be sequentially stretched in optional order. Furthermore, stretching may be carried out at single stage or multiple stages. The stretching ratio is 1.2 or higher, preferably 1.5 or more in area ratio. There may be used various stretching methods such as of using a tenter, carrying out the stretching between rolls, using bubbling by utilizing gas pressure, and by milling. These may be suitably selected or combined. Stretching temperature may be generally set between the glass transition temperature and the melting point of the preliminary molded product. Stretching speed is generally $1 \times 10^1$–$1 \times 10^8$%/min, preferably $1 \times 10^3$ –$1 \times 10^5$%/min.

When the resulting stretched film is further required to have dimensional stability at high temperatures, heat resistance and balancing in strength in film plane, it is preferably subjected to thermal fixing. The thermal fixing can be carried out by conventional methods, and, for example, is carried out by keeping the stretched film at a temperature of the glass transition temperature to the melting point of the film, preferably a temperature lower 100° C. than the melting point to a temperature just below the melting point for about 0.5–120 seconds in a state of strain, relaxation or restricted contraction. This thermal fixation can be carried out twice or more with changing the conditions within the above ranges. Moreover, this thermal fixation may be carried out in an inert gas atmosphere such as argon gas or nitrogen gas. It is preferred to carry out destaticization by ion showering at the time of winding-up.

Thickness of the polymeric film is not limited, and can be optionally selected depending on the standard of the film capacitor to be produced, such as kind, size and performance, but in the case of a film capacitor of roll type, the thickness is usually 0.1–50 μm, preferably 0.3–30 μm, more preferably 0.5–10 μm. When thickness of insulation film is in the above range, the size and the strength of the capacitor are properly balanced, and this is suitable.

The polymeric film of the present invention desirably has an excellent heat resistance, and the heat resistance is measured as a softening temperature of the film in accordance with JIS K7196. That is, in the present invention, the softening temperature of the polymeric film is preferably 100° C. or higher, more preferably 100–400° C., further preferably 100–350° C. This is because the maximum use temperature (heat resistance) of the resulting capacitor becomes higher.

It is necessary that dielectric loss tangent of the polymeric film of the present invention is 0.002 or less in the range of frequency of 1 kHz–1 GHz (25° C.) based on the measurement method shown in JIS C2330, and, especially, when molding materials obtained from thermoplastic cyclic olefin resins as raw material, it is preferably 0.001 or less, more preferably 0.0007 or less.

Within this range of the dielectric loss tangent, the rise of temperature caused by heat generation of dielectric loss is small, and even if the temperature rises, deterioration of performance due to dielectric breakdown hardly occurs, and, hence, capacity and dielectric loss of the resulting film capacitor are highly well balanced and this is suitable.

Specific dielectric constant of the polymeric film of the present invention depends on kinds of resin as a raw material and additives, and is usually 1–10, and, especially, when the molding material used is obtained from thermoplastic cyclic olefin resin, it is usually 2–4, preferably 2–3.5.

A film capacitor usually comprises a film having aluminum or zinc which is vapor-deposited on the surface or an aluminum foil and a film which are superposed in the form of multi-layer. The film serves as a dielectric and the metal serves as an electrode. Recently, film capacitors are mainly in continuous lengths, and there is employed a method of carrying out the vapor deposition of metals in semi-continuous manner or continuous manner. For example, in the case of using a semi-continuous type vapor deposition apparatus for films, metal particles evaporated from a metal vapor deposition source are vapor deposited on a polymeric film unwound from an unwinding roll on a cooling roll, and the film is wound up on another wind-up roll. In the case of using a double-side vapor deposition apparatus for capacitors, the film is further subjected to many steps. When vapor deposition apparatuses are used as above, since the film is rewound at a high speed, the film is required to have a sufficient slipperiness (small friction coefficient between films) and smoothness (surface roughness).

The friction coefficient between the polymeric films of the present invention is 1 or less measured in accordance with ASTM D1894-63, and, especially, when a molding material comprising the thermoplastic cyclic olefin resin is used, it is preferably 0.9 or less, especially preferably 0.7 or less. There is no special lower limit, but the friction coefficient can be 0.1 or more, especially preferably 0.2 or more. Within such range, the film is not cut or entangled, does not slip to cause idling at the time of winding-up, or the film wound up in the form of a roll does not get loose during transportation, and the film can be handled ideally.

Surface roughness of the polymeric film of the present invention can be measured by the method shown in JIS B0601, and is usually 0.5 μm or less, preferably 0.02–0.3 μm. Within this range of the surface roughness, there occurs no winding back or blocking at the time of winding up of the film. Especially, when a molding material comprising the thermoplastic cyclic olefin resin is used, the surface roughness within this range can be obtained even in the case of using particles having a size similar to the thickness of the film (for example, the surface roughness can be sufficiently smaller than the size of the particles). It is one of the excellent features of the thermoplastic cyclic olefin resin that the surface roughness can be made smaller than the size of the particles.

Water absorption of the polymeric film of the present invention is low, and usually 0.1% or less, preferably 0.05% or less, more preferably 0.01% or less. If the water absorption rate is high, the dielectric loss tangent is deteriorated and the dielectric loss increases, and, thus, this is not preferred.

Film Capacitor

In the present invention, a film for capacitor can be obtained by laminating a metal layer on the polymeric film. Depending on the kind of the film capacitor, the metal layer is laminated on both sides or only one side. Furthermore, the metal layer can be laminated on the whole surface or partially laminated. Generally, the electrode layer is laminated on the whole surface of one side.

The electrode layer is not limited, but generally comprises an electrically conductive metal such as aluminum, zinc, gold, platinum or copper, which is used as a metallic foil or vapor deposited metal film. In the present invention, either of the metallic foil or the vapor deposited metal film can be used, or both can be used in combination. Usually, the vapor deposited metal film is preferred because the electrode layer can be made thinner and as a result the capacity can be made greater based on the volume, the film is superior in adhesion to dielectrics, and, besides, variation in thickness is small. When the vapor deposited metal film is used as the electrode layer, the method for the formation of the film is not limited, and the film can be formed by vacuum deposition method, sputtering method, ion plating method, etc. The vapor deposited metal film is not limited to one-layer film, and, if necessary, it may be multi-layered, for example, by a method which comprises forming additionally a semiconductor aluminum oxide film on the aluminum film to give moisture resistance, thereby obtaining the electrode layer (e.g., JP-A-2-250306). Thickness of the vapor deposited metal film is also not limited, but is preferably 100–2,000 Å, more preferably 200–1,000 Å. Within this range of thickness of the vapor deposited metal film, capacity or strength of the capacitor is balanced and the above range is suitable. When a metallic foil is used as the electrode layer, thickness of the metallic foil is also not limited, but is usually 0.1–100 μm, preferably 1–50 μm, more preferably 3–15 μm.

The structure of the film capacitors includes, for example, a laminate type comprising electrode layers and dielectric films which are alternately laminated (JP-A-63-181411, JP-A-3-18113, etc.) and a roll type comprising tape-like dielectric films and electrode layers which are rolled up (one in which the electrode is not continuously laminated on the dielectric film as disclosed in JP-A-60-262414 and one in which the electrode is continuously laminated on the dielectric film as disclosed in JP-A-3-286514). Methods for manufacture of the capacitors differ depending on the structures thereof. The film capacitors of the present invention are not limited in their structure and manufacturing method.

The roll type film capacitor in which the electrode is continuously laminated on the dielectric film and which is simple in structure and relatively easy in manufacture is generally manufactured in the following manner. That is, two dielectric films each of which has an electrode laminated on one side are put one upon another in such a manner that the electrodes do not contact with each other and then these are rolled up. Usually, after being rolled up, they are fixed so that they do not get loose. The fixing method is not limited, and, for example, fixing and protection of the structure may be simultaneously performed by sealing them with resins or enclosing them in an insulation case. Method for connection of lead wires is also not limited, and examples of the method are welding, ultrasonic pressing, hot pressing, and fixation by adhesive tape. The lead wire may be connected to the electrode before rolling up. In the case of enclosing in an insulation case, if necessary, the opening of the case may be sealed with thermosetting resins such as urethane resin and epoxy resin to inhibit oxidative deterioration.

When a metallic thin film layer is formed on a film, the surface of the film can be previously subjected to treatments for improving adhesion, such as corona treatment and plasma treatment. Then, if necessary, the thus formed capacitor element is subjected to end conducting treatment, connection of lead wire, formation of jacket, etc. to obtain a capacitor. Moreover, the capacitor of the present invention may be impregnated with oil, electrolyte or the like to make so-called immersion capacitor.

The thus obtained film capacitor can be made smaller in temperature dependence of the capacity and capacity changing rate can be within the range of preferably ±2%, more preferably ±1%. Furthermore, the film capacitor is wide in the range of use temperature and, besides, excellent in volumetric efficiency, and thus can be suitably used as a temperature compensation type capacitor.

EXAMPLE

The present invention will be specifically explained by the following examples and comparative examples. The solution viscosity (intrinsic viscosity) [η] of the thermoplastic cyclic olefin resin was measured in decalin at 85° C. The molecular weight distribution (Mw/Mn) of the thermoplastic cyclic olefin resin was measured in terms of polystyrene by gel permeation chromatography (GPC) using toluene as a solvent unless otherwise notified. The hydrogenation rate of carbon-carbon unsaturated bond in the main chain was measured by 1H-NMR.

Properties of the film were measured in accordance with JIS C2330 (dielectric constant, dielectric loss tangent, tensile strength, elongation), JIS K7196 (softening temperature of the film), JIS B0601 (surface roughness), JIS K7209 (water absorption rate), and ASTM D1894-63 (friction coefficient). Properties of the film capacitors were measured in accordance with JIS C5101 and 5102 (maximum use temperature, dielectric loss tangent, capacity changing rate).

Reference Example 1

Ethyltetracyclododecene (hereinafter referred to as "ETCD") was ring opening polymerized by a known method, followed by hydrogenation to obtain a hydrogenation product of ETCD ring opening polymer. This hydrogenation product of ETCD ring opening polymer had a solution viscosity [η] of 0.4 dl/g measured in decalin at 85° C., a ratio Mw/Mn of 2.1 measured in terms of polystyrene by GPC using toluene as a solvent, a hydrogenation rate of 99.8% or more, and a Tg of 140° C. measured by DSC.

Reference Example 2

Using a mixture (80/20 in weight ratio) of ETCD and dicyclopentadiene (hereinafter referred to as "DCP"), a hydrogenation product of ETCD/DCP ring opening polymer was obtained in the same manner as in Reference Example 1. This hydrogenation product of ETCD/DCP ring opening polymer had a solution viscosity [η] of 0.4 dl/g measured in decalin at 85° C., a ratio Mw/Mn of 2.1 measured in terms of polystyrene by GPC using toluene as a solvent, a hydrogenation rate of 99.8% or more,. and a Tg of 130° C. measured by DSC.

Example 1

The hydrogenation product of ETCD ring opening polymer obtained in Reference Example 1 and silica (MIZUKASIL P-527 manufactured by Mizusawa Industrial Chemicals, Ltd.; average particle diameter: 1.7 μm) at a weight ratio of 100/0.1 were melt mixed at 240° C. using a twin-screw kneader (TEM 35B manufactured by Toshiba Machine Co., Ltd.; screw diameter: 35 mm, two directions) to prepare a pellet-like molding material.

This molding material was molten at 260° C. and extruded into the form of a sheet by an extruder provided with a T-die at the tip, followed by cooling to obtain a preliminary molded product of 20 μ thick. This preliminary molded product was stretched twofold in lengthwise direction and twofold in width wise direction at 140° C. to obtain a polymeric film of 5 μ thick. Properties of this film were measured and the results are shown in Table 1.

Example 2

A polymeric film of 5 μ thick was obtained in the same manner as in Example 1, except that silica was used at a weight ratio of 100/0.5. Properties of this polymeric film were measured and the results are shown in Table 1.

Example 3

A polymeric film of 5 μ thick was obtained in the same manner as in Example 1, except that silica was used at a weight ratio of 100/2. Properties of this polymeric film were measured and the results are shown in Table 1.

Example 4

A polymeric film of 5 μ thick was obtained in the same manner as in Example 1, except that calcium carbonate (Softon 3200 manufactured by Shiraishi Calcium Co., Ltd.; average particle diameter: 0.70 μm) was used in place of silica at a weight ratio of 100/0.5. Properties of this polymeric film were measured and the results are shown in Table 1.

Example 5

A polymeric film of 5 μ thick was obtained in the same manner as in Example 1, except that silicone particles (TOSPEARL 105 manufactured by Toshiba Silicone Co., Ltd.; average particle diameter: 0.50 μm) was used in place of silica at a weight ratio of 100/0.5. Properties of this polymeric film were measured and the results are shown in Table 1.

Comparative Example 1

A polymeric film of 5 μ thick was obtained in the same manner as in Example 1, except that fine particle silica (Aerosil R-805 manufactured by Nippon Aerosil Co., Ltd.;

average particle diameter: 0.017 μm) was used in place of silica at a weight ratio of 100/0.5. Properties of this polymeric film were measured and the results are shown in Table 1.

Comparative Example 2

A polymeric film of 5 μ thick was obtained in the same manner as in Example 1, except that silica was not used. Properties of this polymeric film were measured and the results are shown in Table 1.

Comparative Example 3

A polymeric film of 5 thick was obtained in the same manner as in Example 1, except that silicone particles (TOSPEARL 105 manufactured by Toshiba Silicone Co., Ltd.; average particle diameter: 0.50 μm) was used at a weight ratio of 100/10. Properties of this polymeric film were measured and the results are shown in Table 1.

Example 6

A polymeric film of 5 μ thick was obtained in the same manner as in Example 1, except that the hydrogenation product of ETCD/DCP ring opening polymer obtained in Reference Example 2 and silica (MIZUKASIL P-527 manufactured by Mizusawa Industrial Chemicals, Ltd.; average particle diameter: 1.7 μm) were used at a weight ratio of 100/0.5. Properties of this polymeric film were measured and the results are shown in Table 1.

Example 7

An aluminum layer of 400 Å was formed at a treating speed of 300 m/sec on the polymeric film obtained in Example 2 by a radiofrequency induction heating type vacuum heating vapor deposition apparatus (manufactured by Nippon Shinku Co., Ltd.), and the resulting metal vapor deposited film was wound up and subjected to compression at 170° C., flame spraying with zinc, connection of lead wire, and packaging with an epoxy resin to obtain a film capacitor. Properties of this film capacitor were measured and the results are shown in Table 2.

Comparative Example 4

A film capacitor was produced in the same manner as in Example 7, except that a polypropylene film (T-2400 #5 manufactured by Toray Industries, Inc.) was used as the polymeric film and the compression temperature was 120° C. Properties of this film capacitor were measured and the results are shown in Table 2.

Comparative Example 5

A film capacitor was produced in the same manner as in Example 7, except that a polyethylene terephthalate film (LUMIRROR #5C manufactured by Toray Industries, Inc.) was used as the polymeric film. Properties of this film capacitor were measured and the results are shown in Table 2.

TABLE 1

Properties of films

|  | Example 1 | Example 2 | Example 3 | Example 4 | Example 5 | Example 6 | Comparative Example 1 | Comparative Example 2 | Comparative Example 3 |
|---|---|---|---|---|---|---|---|---|---|
| Resub (100 parts by weight) | Reference Example 1 | → | → | → | → | Reference Example 2 | Reference Example 1 | → | → |
| Inorganic particles (part by weight) |  |  |  |  |  |  |  | no |  |
| MIZUKASIL P-527 | 0.1 | 0.5 | 2.0 |  |  | 0.5 |  |  |  |
| Softon 3200 |  |  |  | 0.5 |  |  |  |  |  |
| TOSPEARL 105 |  |  |  |  | 0.5 |  |  |  | 10 |
| Aerosil R-805 |  |  |  |  |  |  | 0.5 |  |  |
| Dielectric constant | 2.35 | 2.35 | 2.35 | 2.35 | 2.35 | 2.35 | 2.35 | 2.35 | 2.50 |
| Dielectric loss tangent | 0.0005 | 0.0005 | 0.0005 | 0.0009 | 0.0008 | 0.0005 | 0.0005 | 0.0005 | 0.0022 |
| Tensile strength (kgf/mm$^2$) | 5 | 5 | 5 | 4 | 4 | 5 | 5 | 5 | 1 |
| Tensile elongation (%) | 5 | 5 | 4 | 4 | 4 | 5 | 5 | 5 | 0 |
| Thickness (μ) | 5 | → | → | → | → | → | → | → | → |
| Softening temperature of film (° C.) | 135 | 135 | 135 | 135 | 135 | 110 | 135 | 135 | 135 |
| Water absorption (%) | <0.01 | <0.01 | <0.01 | <0.01 | <0.01 | <0.01 | <0.01 | <0.01 | <0.01 |
| Friction coefficient | 0.85 | 0.50 | 0.49 | 0.65 | 0.68 | 0.53 | 1.32 | 1.54 | 0.50 |
| Surface roughness (μ) | 0.05 | 0.06 | 0.07 | 0.06 | 0.06 | 0.05 | 0.01 | 0.01 | 0.41 |

TABLE 2

Properties of film capacitors

|  | Example 7 | Comparative Example 4 | Comparative Example 5 |
|---|---|---|---|
| Softening temperature of polymer in film as raw material (° C.) | Example 2 135 | Polypropylene 95 | Polyethylene terephthalate 150 |
| Maximum use temperature of capacitor (° C.) | 130 | 85 | 105 |
| Dielectric loss tangent | 0.001 | 0.001 | 0.008 |
| Capacity changing rate (85° C.) | 0% | −3% | +5% |

Industrial Applicability

The polymeric film of the present invention is excellent in performance of insulator film, namely, small in dielectric loss tangent, and, moreover, is free from the problems in handling that the film is apt to cut or become entangled at the rewinding step, and thus it is easy in processing. Therefore, the polymeric film of the present invention can be suitably used for earth insulation, layer insulation and conductor insulation of motors and insulation of transformers, and as dielectrics of capacitors. Furthermore, the polymeric film can be made superior in heat resistance by allowing the film to have a softening temperature of at least 100° C.

Moreover, film capacitors, which are excellent in frequency characteristics and others, can be produced at high productivity by processing the polymeric film of the present invention. The resulting film capacitors are useful for radio communication equipment of airplanes, ships and vehicles; for household DC electrical apparatuses such as radios, televisions and audios; for driving of small motors such as those of air conditioners, washing machines and electric fans; and for improvement of electric power of fluorescent lamps and mercury vapor lamps.

What is claimed is:

1. A polymeric film which has a dielectric loss tangent of 0.002 or less measured at a frequency in the range of 1 kHz to 1 GHz at a temperature of 25° C., a thickness of 0.1 to 50 $\mu$m, a surface roughness of 0.02 to 0.3 $\mu$m, and a friction coefficient of 1 or less between the films of the same material, at least 80% of unsaturated bonds contained in said polymeric film being saturated by hydrogenation.

2. A polymeric film according to claim 1, which comprises a molding material containing 100 parts by weight of a thermoplastic cyclic olefin resin and 0.01–3 parts by weight of at least one kind of particles selected from the group consisting of inorganic particles and silicone particles having an average particle diameter of 0.05–5 $\mu$m.

3. A polymeric film according to claim 2, wherein the cyclic olefin resin is at least one polymer selected from the group consisting of ring opening polymers of monomers having norbornene ring, hydrogenation products of ring opening polymers of monomers having norbornene ring, addition polymers of monomers having norbornene ring with α-olefins, addition polymers of cyclic olefins, hydrogenation products of addition polymers of cyclic olefins, addition polymers of cyclic dienes and hydrogenation products of addition polymers of cyclic dienes.

4. A polymeric film according to claim 3, wherein the cyclic olefin resin is at least one polymer selected from the group consisting of hydrogenation products of ring opening polymers of monomers having norbornene ring and addition polymers of monomers having norbornene ring with α-olefins.

5. A polymeric film according to claim 2, wherein the inorganic particles are at least one kind of inorganic particles selected from the group consisting of those of oxides, hydroxides, sulfides, nitrides, halides, carbonates, sulfates, acetates, phosphates, phosphites, organic carboxylates, silicates, titanates, and borates of elements of Groups 1, 2, 4, 6, 7, 8–10, 11, 12, 13 and 14, hydrate compounds of the above compounds, composite compounds mainly composed of the above compounds, and natural mineral particles having these chemical compositions.

6. A polymeric film according to claim 5, wherein the inorganic particles are at least one kind of inorganic particles selected from the group consisting of silica and calcium carbonate.

7. A polymeric film according to claim 1 which has a softening temperature of 100° C. or higher.

8. A polymeric film according to claim 2, wherein the cyclic olefin resin has a glass transition temperature of 90–350° C.

9. A polymeric film according to claim 2, wherein the cyclic olefin resin has a number average molecular weight of 12,000 to 50,000 in terms of polystyrene.

10. A film capacitor using the polymeric film of claim 1 or 2.

11. A capacitor comprising the polymeric film of claim 1 and an electrode layer.

12. The capacitor according to claim 11, wherein the electrode layer and the polymeric film are laminated with additional electrode layers and polymeric films alternately laminated.

13. The capacitor according to claim 11, wherein the electrode layer and the polymeric film are rolled up.

* * * * *